Patented May 26, 1936

2,042,332

UNITED STATES PATENT OFFICE 2,042,332

SEPARATION OF CYCLIC ALCOHOLS FROM THEIR KETONES

Thomas S. Carswell, Kirkwood, Mo., assignor to Monsanto Chemical Company, St. Louis, Mo., a corporation of Delaware No Drawing. Application February 1, 1934, Serial No. 709,297

3 Claims. (Cl. 202—52)

This invention relates to the separation of cyclic alcohols from cyclic ketones as, for example, the separation of cyclohexanol from cyclohexanone.

Cyclohexanone is obtained by the dehydrogenation of cyclohexanol. For this purpose a wide variety of catalysts may be employed and the conditions under which the reaction is effected may be varied as is indicated in the literature and well understood by those skilled in the art. In all practical embodiments, however, one obtains a mixture of the anone and unconverted anol which must be separated, the anone being recovered in a pure state and the anol being returned to the dehydrogenation step of the process.

One common method of separating two components is by distillation. However, this method is not readily applicable to a mixture of cyclohexanol and cyclohexanone because of the fact that the materials boil within a very few degrees of each other. This fact has been observed heretofore by Green who states on page 191 of his book "Industrial Catalysis" (1928) published by Ernest Benn Ltd.: "A mixture of cyclohexanol and cyclohexanone produced in this way distills between 155 and 165° C. and therefore cannot be easily resolved into its constituents by fractionation." As a result of a careful study of the mixture I have found the separation is even more difficult than indicated by Green inasmuch as pure cyclohexanone has been found to boil under 760 mm. pressure at 155.2° C. whereas pure cyclohexanol boils at 160.2° C. under the same pressure. The difference of 5° between the boiling points is insufficient to enable one to obtain a complete separation. This difficulty is emphasized by the fact that the vapor-liquid equilibrium at 760 mm. pressure does not deviate substantially from a 45° line; in other words, the composition of the vapor which is in equilibrium with a liquid does not differ more than two or three per cent and as the mixture becomes richer in one component this difference diminishes.

I have now found that it is possible to separate the two components from each other completely and efficiently if the distillation be effected at reduced pressures. Thus, I have found that as the distilling pressure is reduced the differences in boiling temperatures of the cyclohexanol and cyclohexanone increase. At the same time the vapor-liquid equilibrium curve assumes an elliptic configuration; in other words, the compositions of the vapor and liquid which are in equilibrium differ substantially, the vapors being richer in anone than in anol as compared to the ratio of these substances in the liquid phase with which the vapors are in equilibrium.

The behavior of these materials at reduced pressures enables one to separate the anol from the anone by fractional distillation readily and completely. The pressure at which the distillation is effected may be varied over a wide range, it being understood that the separation becomes easier as the pressure is reduced. The most favorable conditions are realized after the pressure has been reduced to 100 mm. or lower, although the benefits of my invention may be realized to a large extent at higher pressures. At a pressure of 30 mm. the anone boils at 55° which is sufficiently high to enable one to employ ordinary cooling water to effect complete condensation of the vapors. Moreover, at this pressure the difference in boiling point between the anone and anol is approximately 20°.

To illustrate the advantages of my invention: An equal molar liquid mixture of cyclohexanol and cyclohexanone is in equilibrium when maintained at its boiling temperature under 760 mm. pressures with vapors containing approximately 54% of the anone and 46% of the anol. This difference becomes increasingly less as the amount of one of the components changes. On the other hand, when the same mixture is caused to boil at 30 mm. the vapors in equilibrium with the boiling mixture contain approximately 75% anone and 25% anol. A liquid mixture containing 30% anone and 70% anol is in equilibrium with vapors containing approximately 57.5% anone and 42.5% anol.

The wide difference between the composition of the liquid and vapor which is in equilibrium therewith, as well as the increased differences in boiling points, enables one to separate constituents readily and completely in ordinary fractionating equipment which would be practically impossible of attainment were the distillation to be effected at atmospheric or super-atmospheric pressure.

Although I have disclosed the principles of the invention and have indicated a preferred pressure range of 100 mm. or less, preferably 30 mm., it is to be understood that the advantages of the invention are to be gained under pressures higher than those which have been preferred and that the invention is not limited to the use of any particular apparatus or any precise numerical pressure which has been set forth hereinabove. It is likewise to be understood that the present invention may be applied to the separation of the homologues of cyclohexanol and cyclohexanone, such, for example, as in the separation of the methyl cyclohexanols from their corresponding methyl cyclohexanones.

What I claim is:

1. A method of separating cyclohexanol from cyclohexanone which comprises fractionally distilling a mixture of cyclohexanone and cyclohexanol at an absolute pressure of less than 100 mm.

2. A method of separating cyclohexanol from cyclohexanone which comprises fractionally distilling a mixture of cyclohexanone and cyclohexanol at an absolute pressure of approximately 30 mm.

3. The method of separating cyclohexanol from cyclohexanone which comprises fractionally distilling a mixture of cyclohexanone and cyclohexanol at an absolute pressure not substantially greater than 100 mm.

THOMAS S. CARSWELL.